No. 795,592. PATENTED JULY 25, 1905.
H. EDICK.
WHEELBARROW.
APPLICATION FILED APR. 4, 1904.
2 SHEETS—SHEET 2.
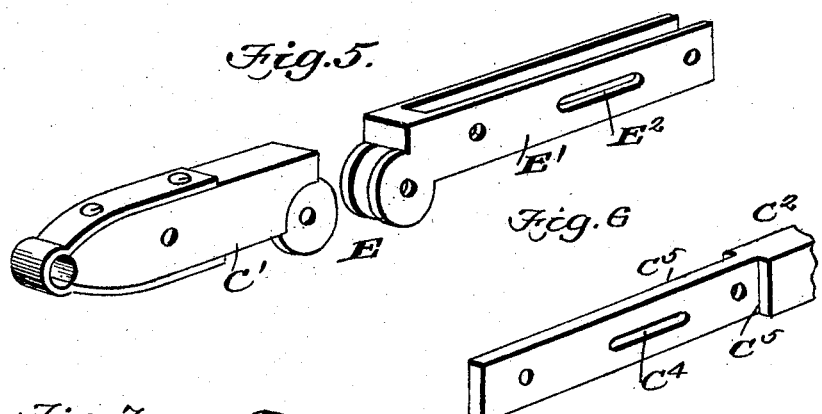
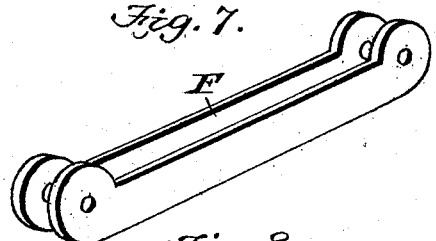
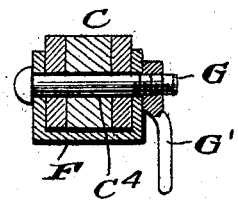
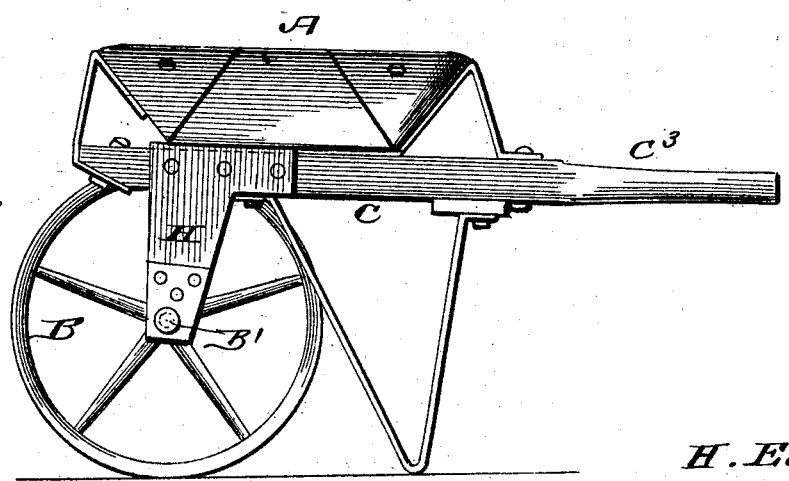
Witnesses
Inventor
H. Edick.
By O'Meara & Brock Attorneys

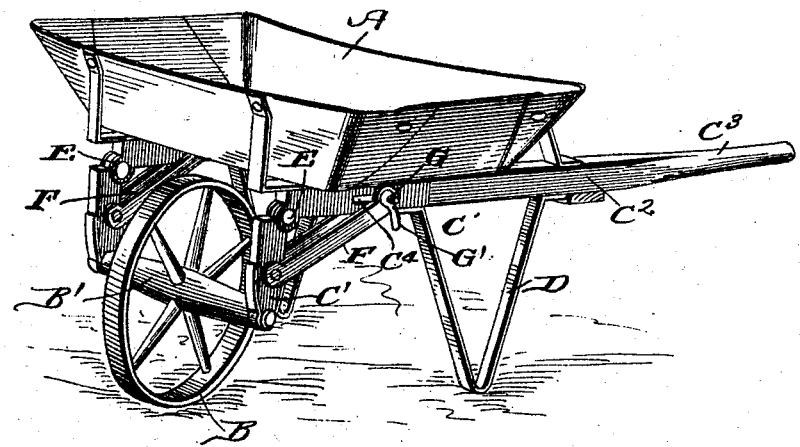
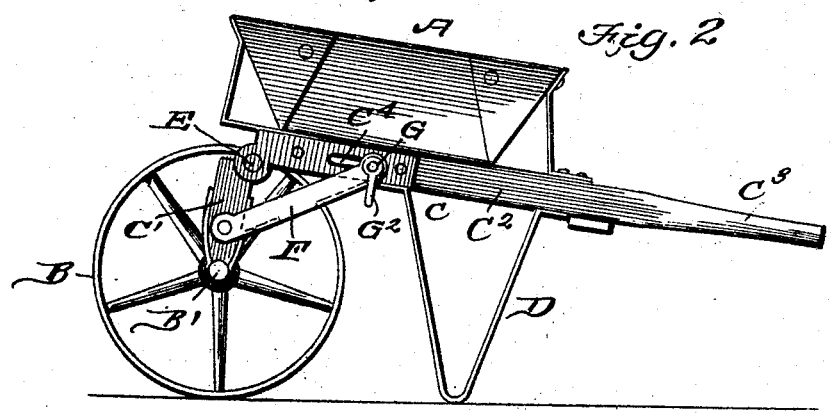
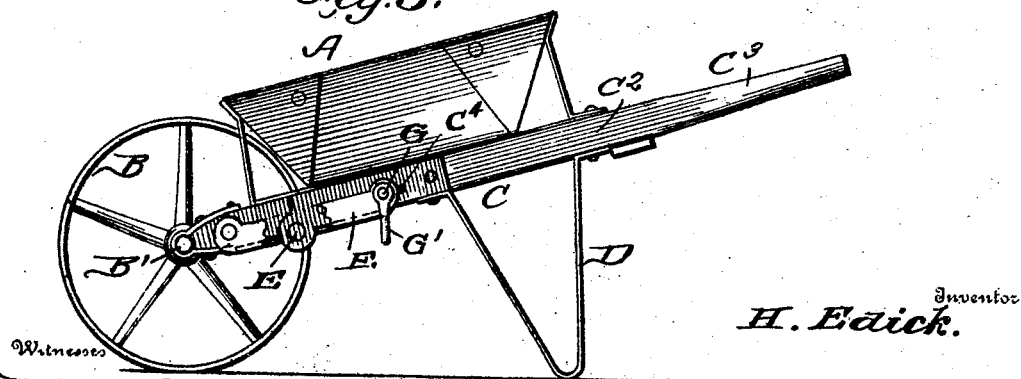

UNITED STATES PATENT OFFICE.

HARVIN EDICK, OF JOHNSTOWN, NEW YORK.

WHEELBARROW.

No. 795,592.    Specification of Letters Patent.    Patented July 25, 1905.

Application filed April 4, 1904. Serial No. 201,513.

*To all whom it may concern:*

Be it known that I, HARVIN EDICK, a citizen of the United States, residing at Johnstown, in the county of Fulton and State of New York, have invented a new and useful Improvement in Wheelbarrows, of which the following is a specification.

This invention relates generally to wheelbarrows, and more particularly to an improved construction of frame carrying the wheel and supporting the hopper, the object being to provide means whereby the wheel can be shifted so as to bring the weight of the load directly over said wheel, so as to render the wheeling operation easier, inasmuch as the strain of supporting the load is entirely relieved from the operator and all of the power can be utilized for propelling purposes.

Another object of the invention is to provide a frame of such character that the wheel can be returned to its normal or forward position whenever the wheelbarrow is employed for any purpose other than transporting heavy loads.

With these objects in view the invention consists, primarily, in making the thills in two sections connected by a hinged joint, the forward section carrying the wheel and adapted to be turned downwardly and fastened so as to throw the weight of the load directly over the wheel when the barrow is being rolled.

This invention consists also in certain details of construction hereinafter fully described, and pointed out in the claims.

In the drawings forming part of this specification, Figure 1 is a perspective view showing the practical application of my invention. Fig. 2 is a side view of the same, the wheel being adjusted beneath the hopper. Fig. 3 is a side view showing the wheel adjusted in advance of the hopper. Fig. 4 shows a slight modification. Fig. 5 is a detail perspective view showing the hinged joint of the thills. Fig. 6 is a detail perspective view showing the reduced end of the rear thill-section. Fig. 7 is a detail perspective view of the connecting-brace. Fig. 8 is a top plan view of the same. Fig. 9 is a transverse sectional view taken through one of the thills.

Referring to the drawings, A indicates the ordinary hopper, and B the ordinary construction of wheel arranged upon the axle $B'$, which is journaled in the usual manner between the forward ends of the thills C, which support the hopper.

D indicates the ordinary construction of legs upon which the barrow rests.

The thills C are made in two sections, $C'$ and $C^2$, the rear sections $C^2$ being shaped into handles $C^3$ at their rear ends. The sections $C'$ and $C^2$ are connected by means of a hinge-joint E, so constructed that the forward section $C'$ can be turned downwardly into the position shown in Figs. 1 and 2, and when turned upwardly, as shown in Fig. 3, the sections present an unbroken thill from end to end. For the purpose of locking the thill-sections in either of their adjusted positions I employ a channeled brace F, which is pivotally connected to the section $C'$ adjacent the wheel-axle, and said brace is slidably connected to the section $C^2$ by means of a bolt G, which passes through the rear end of the brace and through a longitudinal slot $C^4$, produced in the member $C^2$ adjacent its forward end, and upon the threaded end of said bolt is a hand-nut $G'$, which can be quickly and easily tightened for the purpose of binding the parts together. The forward end of each section $C^2$ is reduced upon opposite sides, as shown at $C^5$, to accommodate the metallic plate portions $E'$ of the hinge E, said plates being slotted, as shown at $E^2$, to register with the slots $C^4$ and through which the bolt G passes. By means of this construction the wheelbarrow can be arranged as an ordinary one, as shown in Fig. 3, the channeled braces embracing the hinged joint of the thill-section, and whenever a heavy load is to be moved in the barrow the hand-nuts are released, the forward thill-sections turned down, and braces locked in their rearmost positions, thereby securely holding the wheel in a position directly beneath the hopper, and the rolling operation is thereby greatly facilitated, as the entire weight of the load is relieved from the operator and all of his power can be utilized for propelling the barrow. The load can be very easily dumped by throwing the barrow forwardly over the wheel.

In Fig. 4 I have shown a slight modification in which the wheel is journaled in brackets H, depending from non-sectional thills.

It will thus be seen that I provide a simple and efficient construction of wheelbarrow capable of carrying out all of the objects hereinbefore referred to.

Having thus fully described my invention, what I claim as new, and desire to secure by Letters Patent, is—

1. A wheelbarrow comprising a hopper, the sectional thills, hinge for connecting the sections of the thills and the braces for holding them in either of their adjusted positions.

2. A wheelbarrow comprising a hopper, and wheel, the sectional thills hinged together, the braces pivotally connected to the forward section and slidably connected to the rear section, together with means for locking the rear ends of the braces, as set forth.

3. A wheelbarrow comprising the hopper and wheel, the sectional thills hinged together and the channeled braces pivotally connected to the forward section, a bolt passing through the rear end of the said braces and through longitudinal slots produced in the rear thill-sections, and the nuts for binding the parts together.

4. A wheelbarrow comprising a hopper and a wheeled frame upon which said hopper is mounted, the forward end of said frame being adapted to be turned down and locked and the wheel brought under the hopper.

HARVIN EDICK.

Witnesses:
 CLARENCE W. SMITH,
 BYRON E. NORTHRUP.